Patented July 16, 1946

2,404,251

UNITED STATES PATENT OFFICE 2,404,251

STABILIZATION OF TERPENE PRODUCT

Alfred L. Rummelsburg, Wilmington, Del., assignor to Hercules Powder Company, Wilmington, Del., a corporation of Delaware No Drawing. Application December 11, 1943, Serial No. 513,948

10 Claims. (Cl. 260—631.5)

This invention relates to a method for treating oxidized terpene compounds and more particularly it relates to a method for rendering stable oxidized terpene compounds which tend to undergo spontaneous exothermic reactions.

In the processing of terpene hydrocarbon fractions and especially in the chemical conversion of such materials to terpene alcohols there are obtained by-prdoucts which chiefly comprise monocyclic terpene hydrocarbons of limited usefulness. It has recently been found that such by-products can be converted to much more useful products by oxidation as with atmospheric oxygen. However, oxidation is accomplished by the formation of highly unstable material. These unstable components of the oxidized terpenes tend to undergo spontaneous exothermic reactions upon warming and in some cases a dangerously violent reaction ensues. Their presence has prevented safe practical use of the oxidized terpenes.

It has now been found, in accordance with this invention, that the undesired components can be eliminated safely by treatment of the unstable oxidized terpenes by certain catalytic materials. In accordance with this invention unstable oxidized terpenes are subjected to the action of a catalyst of the group which is known to be capable of decomposing hydrogen peroxide, such as salts and oxides of manganese, copper, silver and gold, until unstable components capable of spontaneous exothermic reaction are substantially eliminated, i. e., are reduced to safe proportions such that the oxidized terpene material may be stored and shipped without danger. The treatment, in general, involves admixture of the unstable material and the catalyst, usually with mild heating coupled with control of the temperature in the exothermic reaction resulting, until a safely stabilized product is obtained.

The method in accordance with this invention is illustrated by the specific embodiments in the following examples. All parts are by weight.

Example 1

A terpene fraction consisting of monocyclic terpenes boiling above 170° C. and containing chiefly terpinolene, alpha-, beta-, and gamma-terpinenes, dipentene, limonenes, with some menthenes, sabinene, 1-4 and 1-8 cineols, was oxidized by passing air therethrough at a temperature of 60-70° C. until the specific gravity of the mixture at 15.5° C. rose to 0.993. One hundred parts of the resulting unstable oxidized product were mixed with 0.4 part of manganese sulfate and the mixture was heated at 85-90° C. for three hours with vigorous agitation. The product was slightly darker than the original unstable material. The manganese sulfate was not removed from the product although where its presence is objectionable it may be removed by water washing. The stabilized product had an iodine liberation value less than 1/7 of the value before treatment.

Example 2

Terpinolene was oxidized by subjecting it to oxygen under 40 to 50 lbs. per square inch pressure at a temperature maintained at 50° C. until the terpinolene increased in weight by 25-27%. One hundred parts of this material were mixed with 0.6 part of manganese acetate and the mixture was heated at 70-80° C. for four hours with vigorous agitation. The resulting product was slightly darker than the original material. No exothermic reaction was observed upon heating the product to 150° C. It had a negligible iodine liberation value. The catalyst was left in the product.

Example 3

A terpene fraction consisting of monocyclic terpenes boiling above 170° C. and containing chiefly terpinolene, alpha-, beta-, and gamma-terpinenes, dipentene, limonenes, with some menthenes, sabinene, 1-4 and 1-8 cineols, was oxidized by blowing oxygen through the material at a temperature of 50° C. until the specific gravity at 15.5° C. rose to 0.990. One hundred parts of this material and 2 parts of copper linoleate were heated for five hours at a temperature between 75 and 85° C. The product had a negligible iodine liberation value and did not liberate a gas or undergo an exothermic reaction when heated up to 150° C.

Example 4

One hundred parts of the oxidized terpene fraction described in Example 3 and 0.8 part of cuprous oxide were heated at 85-90° C. for three hours with vigorous agitation. The product had a negligible iodine liberation value.

The method in accordance with this invention is applicable to oxidized terpenes or terpene mixtures which are characterized by instability of the type which leads to spontaneous exothermic reaction entirely within the material itself. Instability of this nature is readily determined by heating a small quantity of material to a temperature of 120° C. and noting whether appreciable evolution of gas occurs or whether a sharp temperature rise indicating an exothermic reaction occurs at the said temperature or during heating to the said temperature. The method in accordance with this invention is particularly directed to unstable products of this nature which are derived by oxidation with pure or diluted oxygen gas, for example, with air, of monocyclic terpene hydrocarbon fractions with a boiling point or boiling range between about 170° C. and about 195° C. Such fractions will usually contain one or more compounds of the group represented by dipentene, limonene, alpha-terpinene, beta-terpinene, terpinolene, 1-4 cineol, 1-8 cineol, etc. The process is especially valuable in the treatment of fractions containing appreciable portions of terpinolene since it has been found that terpinolene is outstanding among terpenes in its ease of oxidation by gaseous oxygen and also in its tendency to form unstable compounds.

Typical unstable oxidized terpene compounds are those obtained by air-oxidation at, for example, a temperature between about 0° C. and about 85° C. and especially at temperatures between about 30° C. and about 60° C. of such commercial terpene cuts as those known as "Solvenol" and "Bysol." These materials contain in variable quantities the particular terpenes hereinabove mentioned. Bysol is characterized by a content of terpinolene which is usually above about 25%. The product formed by air-oxidation of terpenes of terpene fractions of this nature will, in typical cases, comprise about 15% to about 30% of water-soluble material of an oxygenated terpene character, about 40% to about 65% of steam distillable fraction consisting mainly of terpene hydrocarbons having boiling points above about 170° C., and about 20% to about 50% of steam distillation residue which is a viscous liquid or semi-liquid relatively rich in oxygen and comprises polymeric terpenic compounds.

It has now been found that unstable oxidized monocyclic terpenes are rendered stable by treatment as herein disclosed with certain catalysts. These catalysts include the oxides and salts of certain metals, such as manganese and the metals of group IB, copper, silver, and gold. For example, manganese dioxide, manganese sulfate, manganese acetate, cupric oxide, cuprous oxide, silver oxide, auric oxide, copper acetate, copper sulfate, copper chloride, copper oleate, copper linoleate, copper ricinoleate, cuprous chloride, silver nitrate, silver chloride, and auric chloride, are operable in accordance with the conditions used in the examples. Of these compounds, manganese sulfate, manganese acetate, copper linoleate, and cuprous oxide have been found particularly useful.

The catalyst will be utilized in a quantity which varies to some extent with the nature of the catalyst and the degree of instability of the material being treated. It may vary from traces such as about 1/1000 of 1% to about 25% of the terpenic material and will, in most cases, be utilized in a quantity between about 0.2% and about 5% of the weight of the terpenic material.

The treatment will comprise either vigorous agitation to mix the catalyst and the terpenic material or will comprise passing the terpenic material through a bed of the catalyst. The treatment will be carried out at a temperature between about 30° C. and about 100° C. and preferably will comprise treatment almost entirely within the range between about 70° C. and about 100° C. In most cases, the treatment will involve initial heating which brings about an exothermic reaction. At this point, vigorous agitation is highly desirable and cooling will, in most cases, be resorted to to maintain the reaction mixture within the desired range to prevent excessively rapid heat evolution from taking place. After the reaction has quieted down and the heat evolution is slow, the temperature is usually maintained for a time by external heating to insure complete elimination of unstable material. In all cases, the treatment is continued within the temperature ranges mentioned until components capable of spontaneous exothermic reaction have been reduced to a small safe proportion or have been substantially eliminated. A stable mixture of oxidized terpene compounds results. This mixture is incapable of spontaneous exothermic reaction.

A convenient manner of operation involves heating a portion of the material to be stabilized with the catalyst to the desired range in a vessel with temperature control means and adding increments of material at a rate such that the desired temperature is maintained by the reaction. After all the material has been added, the temperature is maintained, heating if necessary, until unstable material has been substantially eliminated. The reaction may also be carried out continuously by passing the material to be stabilized with the catalyst through a coil with temperature control jacketing wherein the material is held for the desired length of time within the desired temperature range.

The product may be recovered after stabilization by filtration from solid catalysts or by decantation from aqueous solutions of catalysts where such are employed. Washing with water may be utilized to eliminate all water-soluble catalyst although this is usually unnecessary. It will be appreciated that treatment with water or aqueous solutions tends to eliminate water-soluble components of the oxidized terpenic mixture and in some cases this is not desirable.

The manner in which treatment with the catalysts brings about stabilization is not fully understood but it is believed that higher oxides are probably decomposed with the aid of the catalysts to materials of lower oxidation representing the desired stable oxidized terpene. By-products may in some cases comprise some water and carbon dioxide. It is believed the reaction may frequently involve oxidation of some unoxidized terpenes or very slightly oxidized terpenes present in the mixture to bring the components to a stable oxidized condition.

The method in accordance with this invention stabilizes unstable oxidized terpenes with practically a 100% yield since the unstable materials are converted to useful terpenic derivatives similar in nature to stable components of the mixture. Instability may be tested for by heating a sample to 120° C. and noting whether appreciable gas evolution or an exothermic reaction indicated by a rapid temperature rise occurs. Instability may also be tested for by noting the ability of the material to liberate free iodine upon being heated with an acidified alkali metal iodide solution. It is characteristic of unstable products that they liberate iodine under these conditions freely. The stabilized product is incapable of appreciable spontaneous exothermic reaction upon being heated and is also characterized by little or no iodine liberation upon heating with acidified aqueous alkali metal iodides. It will be characterized by an iodine liberation value of not above the equivalent of 1.0% hydrogen peroxide.

The stabilized, oxidized, monocyclic terpene products obtained by the method in accordance with this invention are useful as solvents in paints and varnishes and as flotation reagents and may also be utilized to modify surface tension as detergent aids. Water-soluble portions are useful as softeners for paper, Cellophane, and other Cellophane products.

This application constitutes a continuation-in-part of my application for United States Letters Patent, Serial No. 413,305, filed October 2, 1941.

What I claim and desire to protect by Letters Patent is:

1. A process for improving unstable air-oxidized monocyclic terpenes which comprises subjecting the said air-oxidized terpenes to the action of manganese sulfate until components capable of spontaneous exothermic reaction are substantially eliminated.

2. A process for improving unstable air-oxidized monocyclic terpenes which comprises subjecting the said air-oxidized terpenes to the action of manganese acetate until components capable of spontaneous exothermic reaction are substantially eliminated.

3. A process for improving unstable air-oxidized monocyclic terpenes which comprises subjecting the said air-oxidized terpenes to the action of cuprous oxide until components capable of spontaneous exothermic reaction are substantially eliminated.

4. A process which comprises subjecting unsaturated monocyclic terpenes, boiling above 170° C. to air oxidation at a temperature below about 85° C., until an appreciable rise in specific gravity and in weight of the terpene has occurred, and then subjecting the air-oxidized terpene to the action of a manganese sulfate until the components capable of spontaneous exothermic reaction are substantially eliminated.

5. A process which comprises subjecting unsaturated monocyclic terpenes, boiling above 170° C. to air oxidation at a temperature below about 85° C., until an appreciable rise in specific gravity and in weight of the terpene has occurred, and then subjecting the air-oxidized terpene to the action of a manganese acetate until the components capable of spontaneous exothermic reaction are substantially eliminated.

6. A process which comprises subjecting unsaturated monocyclic terpenes, boiling above 170° C. to air oxidation, at a temperature below about 85° C. until an appreciable rise in specific gravity and in weight of the terpene has occurred, and then subjecting the air-oxidized terpene to the action of cuprous oxide until the components capable of spontaneous exothermic reaction are substantially eliminated.

7. A process for improving unstable air-oxidized monocyclic terpenes which comprises subjecting the said air-oxidized terpenes to the action of a compound selected from the group consisting of manganese dioxide, manganese sulfate, manganese acetate, cuprous oxide, cupric oxide, copper acetate, copper sulfate, cuprous chloride, cupric chloride, copper oleate, copper linoleate and copper ricinoleate.

8. A process for improving unstable air-oxidized monocyclic terpenes which comprises subjecting the said air-oxidized terpenes to the action of a compound selected from the group consisting of manganese dioxide, manganese sulfate, manganese acetate, cuprous oxide, cupric oxide, copper acetate, copper sulfate, cuprous chloride, cupric chloride, copper oleate, copper linoleate and copper ricinoleate at a temperature between about 30° C. and about 100° C.

9. A process for improving unstable air-oxidized monocyclic terpenes which comprises subjecting the said air-oxidized terpenes to the action of a compound selected from the group consisting of manganese dioxide, manganese sulfate, manganese acetate, cuprous oxide, cupric oxide, copper acetate, copper sulfate, cuprous chloride, cupric chloride, copper oleate, copper linoleate and copper ricinoleate at a temperature between about 70° C. and about 100° C.

10. A process which comprises subjecting unsaturated monocyclic terpenes boiling above 170° C. to air oxidation at a temperature below about 85° C. until an appreciable rise in specific gravity and in weight of the terpene has occurred, and then subjecting the air-oxidized terpene to the action of a compound selected from the group consisting of manganese dioxide, manganese sulfate, manganese acetate, cuprous oxide, cupric oxide, copper acetate, copper sulfate, cuprous chloride, cupric chloride, copper oleate, copper linoleate and copper ricinoleate.

ALFRED L. RUMMELSBURG.